United States Patent
Long et al.

(10) Patent No.: US 9,666,993 B2
(45) Date of Patent: May 30, 2017

(54) EMI CONTAINMENT FOR CONNECTOR ASSEMBLY

(71) Applicant: TYCO ELECTRONICS CORPORATION, Berwyn, PA (US)

(72) Inventors: Richard James Long, Columbia, PA (US); Alex Michael Sharf, Harrisburg, PA (US); Steven David Dunwoody, Middletown, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 14/824,605

(22) Filed: Aug. 12, 2015

(65) Prior Publication Data

US 2017/0047690 A1   Feb. 16, 2017

(51) Int. Cl.
*G02B 6/36* (2006.01)
*H01R 13/6581* (2011.01)
*G02B 6/42* (2006.01)

(52) U.S. Cl.
CPC ....... *H01R 13/6581* (2013.01); *G02B 6/4277* (2013.01)

(58) Field of Classification Search
CPC ............... G02B 6/4277; H01R 13/6581
USPC ........................................ 385/92; 439/607.01
See application file for complete search history.

(56) References Cited

U.S. PATENT DOCUMENTS

| | | | |
|---|---|---|---|
| 7,473,131 B2 | 1/2009 | Dunwoody et al. | |
| 7,583,510 B2 | 9/2009 | Wang | |
| 2003/0141090 A1* | 7/2003 | Kruger | G02B 6/4201 174/50 |
| 2007/0212942 A1* | 9/2007 | Long | G02B 6/4201 439/607.17 |

* cited by examiner

*Primary Examiner* — Jerry Blevins

(57) ABSTRACT

A connector assembly includes a cage member receiving a pluggable module and providing electrical shielding for the pluggable module. The cage member is mounted behind a bezel and aligned with a bezel opening. The connector assembly includes an EMI skirt at the front end of the cage member. The EMI skirt includes plural spring beams integral and having a unibody design with the cage member. Each spring beam has a front bend at the exit point from the cage member, a base extending rearward from the front bend and an arm extending from the base outward in a direction generally away from the cage member. The cage member is positioned relative to the bezel such that the arms reside behind the bezel. The arms have bezel mating interfaces configured to engage and electrically connect to the bezel.

14 Claims, 3 Drawing Sheets

EMI CONTAINMENT FOR CONNECTOR ASSEMBLY

BACKGROUND OF THE INVENTION

The subject matter herein relates generally to electromagnetic interference (EMI) containment for a connector assembly.

Some known connector assemblies include a metal cage having one or more ports that each receive a corresponding transceiver module, such as a small form factor pluggable (SFP) module, therein. The pluggable module may plug into a communication connector that is held within the cage and is connected to a host circuit board. A front end of the cage that includes the port for the pluggable modules is typically held within an opening in a panel or bezel of a housing or device. EMI containment around the cage at the front end requires a good connection between the cage and the bezel.

Conventional connector assemblies utilize an EMI gasket or a stamped and formed clip coupled to the front end that has spring fingers configured to engage the bezel. One advantage to using the EMI gasket is that the EMI gasket provides a behind-the-panel connection which is desirable because the connection remains out of sight and protected by the bezel. However, the EMI gaskets may be expensive. Additionally, the EMI gaskets only operate under very specific compression ranges requiring tight mechanical constraints for cage positioning relative to the bezel. The advantage of the EMI clip is that the EMI clips are less expensive to manufacture than the EMI gaskets and have a wider tolerance for connection to the bezel. However, the clips must be assembled to the front end of the cage, which requires an assembly step. The spring fingers of the EMI clips must be aligned with the interior surface of the opening and the cage must protrude through the opening in the bezel in order for the springs fingers to make contact with the bezel. The spring fingers only make contact to a thin surface of the bezel that is the thickness of the bezel.

A need remains for an EMI containment solution between a cage and a bezel that is cost effective and reliable.

BRIEF DESCRIPTION OF THE INVENTION

In one embodiment, a connector assembly is provided including a cage member having a plurality of walls defining a port configured to receive a pluggable module therein through a front end of the cage member. The walls extend rearward from the front end to a rear end of the cage member. The walls are manufactured from a metal material and providing electrical shielding for the port. The cage member is configured to be mounted generally behind a bezel and being aligned with an opening in the bezel to receive the pluggable module. The connector assembly includes an EMI skirt at the front end of the cage member. The EMI skirt includes plural spring beams extending from the walls at exit points. The spring beams and cage member are integral and have a unibody design. Each spring beam has a front bend at the exit point from the corresponding wall at the front end of the cage member. Each spring beam has a base extending rearward from the front bend along the exterior of the cage member and spaced apart from the corresponding wall of the cage member. The cage member is positioned relative to the bezel such that the base passes through the opening in the bezel. Each spring beam has an arm extending from the base outward in a direction generally away from the cage member. The cage member is positioned relative to the bezel such that the arms reside behind the bezel. The arms have bezel mating interfaces configured to engage and electrically connect to the bezel.

In another embodiment, a connector assembly is provided including a cage member having a plurality of walls defining a port configured to receive a pluggable module therein through a front end of the cage member. The walls extend rearward from the front end to a rear end of the cage member. The walls are manufactured from a metal material and provide electrical shielding for the port. The cage member is configured to be mounted generally behind a bezel and is aligned with an opening in the bezel to receive the pluggable module. An EMI skirt is provided at the front end of the cage member. The EMI skirt includes plural spring beams extending from corresponding connection points with the cage member exterior of the cage member. Each spring beam has a base extending rearward along and spaced apart from the corresponding wall of the cage member. Each spring beam has an arm extending from the base outward in a direction generally away from the cage member. The bases of the spring beams each have bezel mating interfaces configured to engage and electrically connect to the bezel. The arms of the spring beams each have bezel mating interfaces configured to engage and electrically connect to the bezel. Each spring beam is configured to engage the bezel at multiple contact points defined by the bezel mating interfaces.

In a further embodiment, an EMI skirt is provided for a cage member of a connector assembly mounted behind a bezel and aligned with an opening in the bezel for receiving a pluggable module therein. The EMI skirt includes spring beams configured to be received in the opening of the bezel. The spring beams extend from connection points of corresponding walls of the cage member at a front end of the cage member. Each spring beam has a front bend at the connection point bending the spring beam exterior of the cage member. Each spring beam has a base extending rearward from the front bend along the exterior of the cage member and spaced apart from the corresponding wall of the cage member. Each spring beam has an arm extending from the base outward in a direction generally away from the cage member. The bases of the spring beams each have bezel mating interfaces configured to engage and electrically connect to the bezel and the arms of the spring beams each having bezel mating interfaces configured to engage and electrically connect to the bezel such that each spring beam is configured to engage the bezel at multiple contact points defined by the bezel mating interfaces.

DETAILED DESCRIPTION OF THE INVENTION

Figure 1:
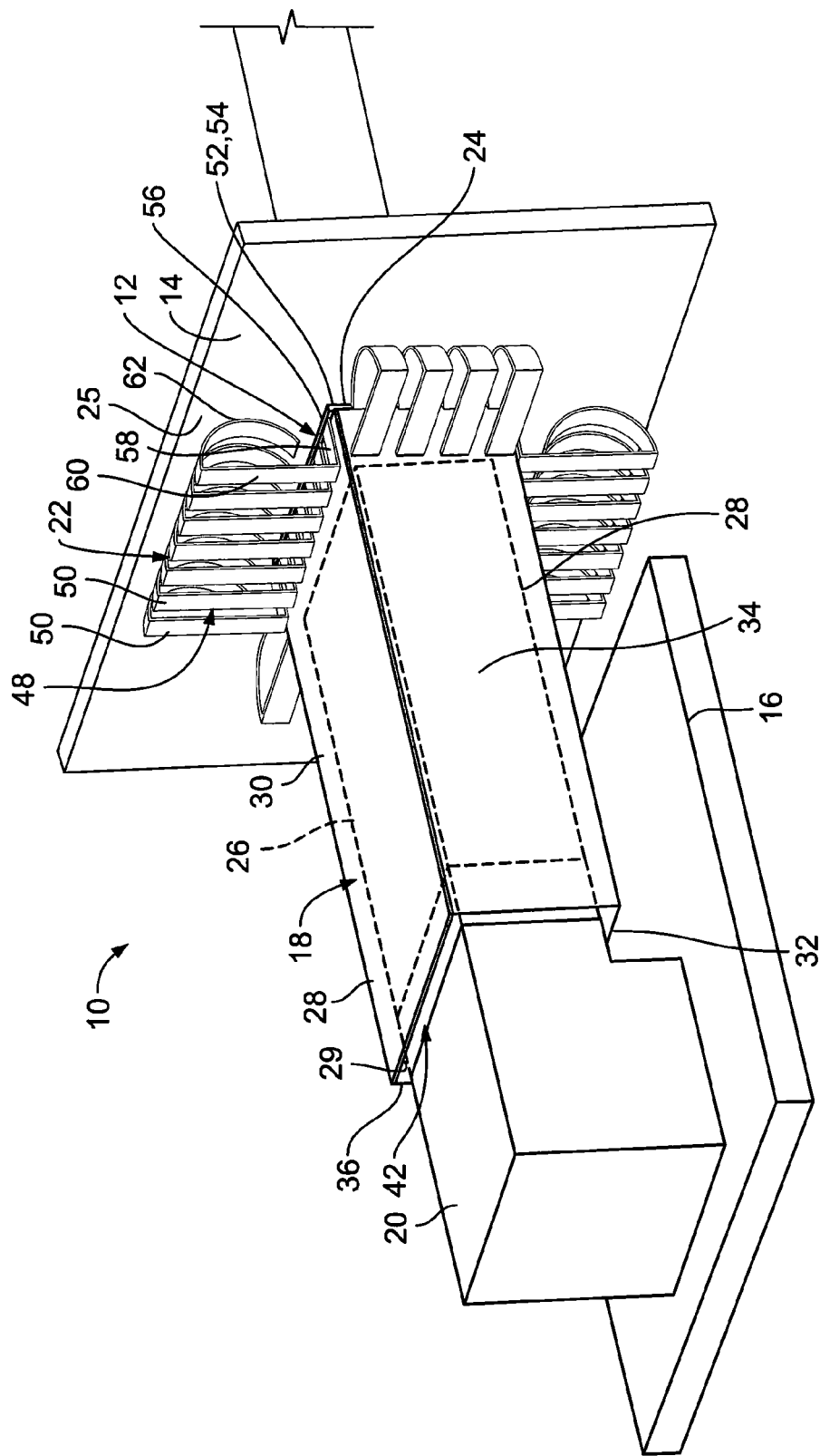
FIG. 1 is a rear perspective view of an exemplary embodiment of a connector assembly.

FIG. 1 is a rear perspective view of an exemplary embodiment of a connector assembly 10. The connector assembly 10 is shown mounted in an opening 12 (also shown in FIG. 2) in a panel or bezel 14 and mounted on a circuit board 16. The connector assembly 10 may pass at least partially through the opening 12 in the bezel 14. The connector assembly 10 is configured to be positioned on the circuit board 16 for connecting one or more pluggable modules 26 (shown schematically in FIG. 1, also shown in FIG. 6), such as, but not limited to, a small form-factor pluggable (SFP) modules, to the circuit board 16 via a communication connector(s) 20. The modules may be electrical modules, optical modules or other types of modules.

The bezel 14 may be provided at a front of a panel, chassis, housing or other structure in which the connector assembly 10 is utilized. The circuit board 16 is provided interior of such housing and thus behind the bezel 14. The connector assembly 10 enables the pluggable module(s) 26 located outside the housing to be electrically connected to the circuit board 16 contained within the housing. In an exemplary embodiment, the bezel 14 is conductive, such as a metal material, and provides shielding for the housing. The connector assembly 10 is configured to be electrically connected or commoned to the bezel 14 to reduce or prevent EMI leakage through the opening 12.

The connector assembly 10 includes a shielded cage member 18 and the communication connector 20 is configured to be at least partially positioned therein. In the illustrated embodiment, the connector assembly 10 is a single port assembly and the cage member 18 is configured to receive a single pluggable module 26 and a single communication connector 20; however the connector assembly 10 may be a multi-port assembly configured to receive multiple pluggable modules 26 and have corresponding plural communication connectors 20 therein.

An EMI skirt 22 is provided at a front end 24 of the cage member 18. The EMI skirt 22 physically engages and is electrically connected to the bezel 14 to reduce electromagnetic interference (EMI) emissions through the opening 12. In an exemplary embodiment, the EMI skirt 22 is integral with the cage member 18 such that the EMI skirt 22 and the cage member 18 have a unibody design (for example, a unitary single piece body). Optionally, the EMI skirt 22 and the cage member 18 are stamped and formed from a single metal sheet. In other various embodiments, rather than being integral or unitary, the EMI skirt 22 may be a separate component coupled to the front end 24. For example, the EMI skirt 22 may be mounted on the cage member 18 using any suitable configuration, arrangement, method, structure, means, and/or the like, such as, but not limited to, clipping, fastening, using adhesive, frictional and/or stictional engagement, welding, one or more latching mechanisms, mechanical fasteners, and/or the like.

During assembly, the bezel 14 is mounted to the panel, chassis and/or the cage member 18. The bezel 14 is mounted over the front end 24. Optionally, a plurality of electrical connector assemblies 10 may be provided in one or more rows and the bezel 14 may include multiple openings 12 (or one large opening) for the plurality of electrical connector assemblies 10. Optionally, the front end 24 passes at least partially through the opening 12 such that the EMI skirt 22 is aligned with and received within the opening 12. The EMI skirt 22 engages the edges of the bezel 14 defining the opening 12. The EMI skirt 22 also extends behind the bezel 14 and is configured to engage an interior surface 25 of the bezel 14. As such, the EMI skirt 22 has multiple points of contact with the bezel 14. The EMI skirt 22 is electrically connected to the bezel 14 at such contact points and blocks EMI emissions through the opening 12.

The cage member 18 is a shielded cage member that includes a plurality of shielded walls 28 extending from the front end 24 to an opposite rear end 29. Optionally, the cage member 18 is a shielded, stamped and formed cage member. In the exemplary embodiments, the cage member 18 has a generally rectangular cross section, and the plurality of walls 28 includes an upper wall 30, a lower wall 32, and side walls 34 and 36. However, the cage member 18 may include any suitable cross-sectional shape and any number of walls that enable the cage member 18 to function as desired and/or described herein. The cage member 18 includes an internal compartment defining a port 38 (shown in FIG. 2). The port 38 is configured to at least partially receive a pluggable module 26 therein through an opening at the front end 24. While a single port 38 is shown in the illustrated embodiment, the cage member 18 may be a stacked cage member having multiple ports in a stacked configuration (for example, stacked vertically and/or stacked horizontally).

The cage member 18 includes an opening 42 extending through the rear end 29 of the cage member 18 for at least partially receiving the communication connector 20 in the internal compartment of the cage member 18. Alternatively, the opening may be provided in the lower wall 32 with the communication connector 20 entirely contained within the cage member 18.

The EMI skirt 22 is provided at the front end 24 of the cage member 18. The EMI skirt 22 includes a plurality of spring beams 50 extending from the walls 28 of the cage member 18. In an exemplary embodiment, the spring beams 50 extend from each of the upper wall 30, the lower wall 32, the side wall 34 and the side wall 36. Optionally, a plurality of spring beams 50 extend from each of the walls 28. As such, the spring beams 50 of the EMI skirt 22 surround the front end 24 of the cage member 18. The spring beams 50 are separated by spaces 48 therebetween. Optionally, the spaces 48 may be narrower than widths of the spring beams 50. As such, adjacent spring beams 50 are independently movable. Optionally, adjacent spring beams 50 may be tied together using a tie bar or other component spanning across the spaces 48. As such, damage to the spring beams 50 is reduced as the distal ends are not able to be caught or snagged on components, such as during shipping or loading of the bezel 14 onto the cage member 18.

The spring beams 50 extend from corresponding connection points 52 with the corresponding walls 28. The spring beams 50 are electrically connected to the walls 28 at the connection points 52. In the illustrated embodiment, the connection points 52 are defined by exit points 54 of the spring beams 50 from the walls 28 at the front end 24. For example, the spring beams 50 are integrally formed with the cage member 18 and the spring beams 50 are extensions forward of the walls. In alternative embodiments, rather than being integral, the EMI skirt 22 may be mounted to the cage member 18 at the front end 24, such as using a clip or clip features of the EMI skirt 22. The location where the EMI skirt 22 engages the wall 28 defines the connection points 52.

In an exemplary embodiment, the spring beams 50 initially extend forward from the front end 24 and include front bends 56 that change direction of the spring beams 50 to allow the spring beams 50 to extend rearward. The front bends 56 wrap around the exterior of the cage member 18 such that the spring beams 50 extend rearward along the walls 28.

The spring beams 50 include bases 58 extending rearward from the front bends 56. The bases 58 extend along the exterior of the cage member 18 and are spaced apart from the corresponding walls 28 of the cage member 18. The bases 58 may extend generally parallel to the walls 28. Alternatively, the bases 58 may be arced or curved, such as to provide a convex arc with the middle of each base further from the corresponding wall 28 and the ends of each base 58 closer to the corresponding wall 28. Having the bases 58 curved outward may ensure that the bases 58 engage the bezel 14 within the opening 12.

The spring beams 50 include arms 60 extending from the bases 58 outward in a direction generally away from the cage member 18. The arms 60 have bezel mating interfaces 62 configured to engage and electrically connect to the interior surface 25 of the bezel 14. In the illustrated embodiment, the arms 60 extend from the bases 58 at approximate right angles; however, the arms 60 may extend from the bases 58 at any angle.

The spring beam 50 may have other shapes in alternative embodiment. The spring beam 50 may have other segments in addition to the front bend 56, the base 58 and the arm 60 of the illustrated embodiment. Optionally, different spring beams 50 may have different shapes. For example, spring beams 50 along the side walls 34, 36 may have different sizes or shapes than the spring beams 50 extending from the upper wall 30 and/or the lower wall 32.

Figure 2:
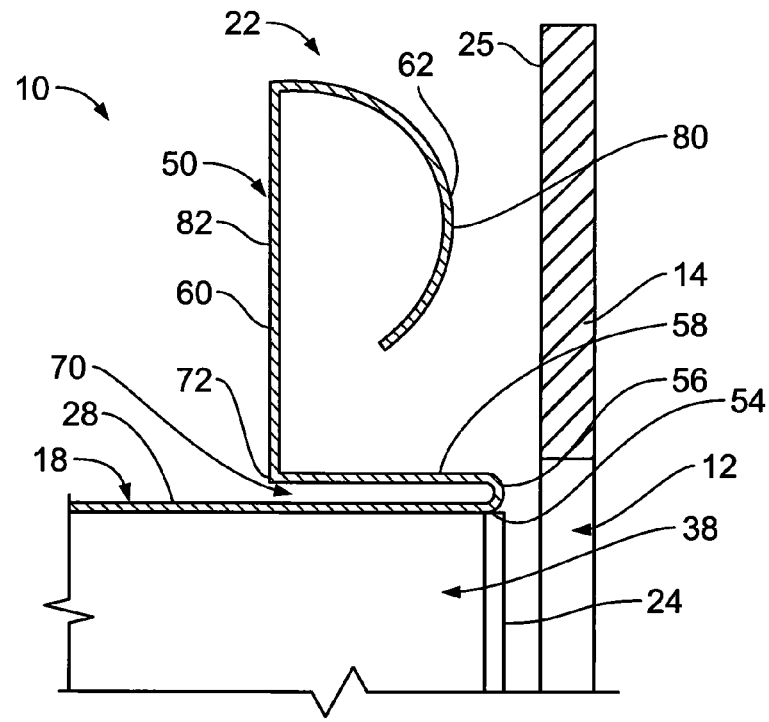
FIG. 2 is a cross-sectional view of a portion of the connector assembly showing a cage member poised for mating with a bezel.
Figure 3:
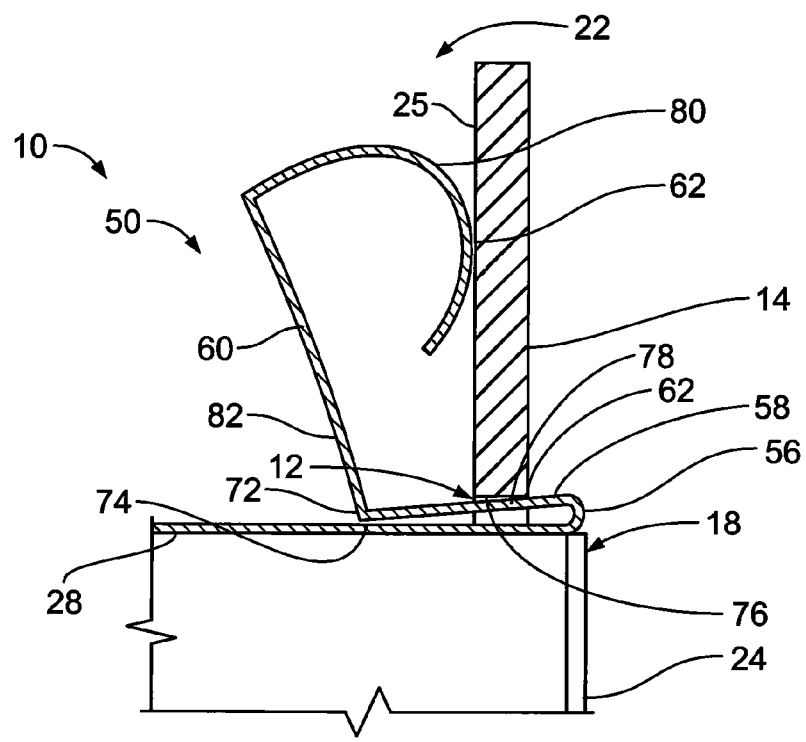
FIG. 3 is a cross-sectional view of a portion of the connector assembly showing the bezel mated to the cage member.

FIG. 2 is a cross-sectional view of a portion of the connector assembly 10 showing the cage member 18 poised for mating with the bezel 14. FIG. 3 is a cross-sectional view of a portion of the connector assembly 10 showing the bezel 14 mated to the cage member 18. During mating, the bezel 14 is loaded onto the front end 24 of the cage member 18 such that the front end 24 extends at least partially through the opening 12. Alternatively, rather than loading the bezel 14 onto the cage member 18, the bezel 14 may be fixed and the cage member 18 may be mated with the bezel 14 by loading the front end 24 at least partially through the opening 12.

When the bezel 14 and cage member 18 are mated (FIG. 3), the cage member 18 is positioned relative to the bezel 14 such that the base 58 passes at least part way through the opening 12. Optionally, the base 58 may extend entirely through the opening 12 such that a portion of the base 58 is positioned forward of a front surface of the bezel 14. The base 58, in an exemplary embodiment, is electrically connected to the bezel 14 within the opening 12. The electrical connection between the base 58 of the spring beam 50 and the bezel 14 facilitates containing EMI emissions by providing a contact point that grounds the spring beam 50 to the bezel 14. The engagement between the base 58 and the bezel 14 also facilitates securely holding the cage member front end 24 within the opening 12. For example, as the cage member front end 24 is received within the opening 12, an interior edge 76 defining the opening 12 deflects and/or deforms the base 58 of the spring beam 50 generally radially inwardly against an internal bias of the spring beam 50, which exerts a spring force on the bezel 14 to securely hold the cage member front end 24 within the opening 12. A size, shape, material, and/or the like of the spring beam 50 may be selected to provide a predetermined spring force.

When mated, the cage member 18 is positioned relative to the bezel 14 such that the arm 60 is positioned rearward of the interior surface 25 of the bezel 14. When mated, the arm 60 engages the interior surface 25 at the bezel mating interface 62 to electrically connect the EMI skirt 22 to the bezel 14. Optionally, the spring beam 50 may be elastically deformed when the bezel 14 is mated to the cage member 18 to create an internal spring force biasing the arm 60 against the bezel 14 to ensure that the bezel mating interface 62 remains engaged to the interior surface 25 of the bezel 14.

The spring beam 50 is shown as being integral with and a continuous extension of the corresponding wall 28. The front bend 56 wraps the spring beam 50 rearward exterior of the wall 28 such that a gap 70 is formed between the base 58 and the wall 28. In an exemplary embodiment, the spring beam 50 is flexible or deflectable such that portions of the spring beam 50 may be elastically deformed when the spring beam 50 engages and mates to the bezel 14. For example, the base 58 may be elastically deformed and bent toward the wall 28 to at least partially close the gap 70 when the spring beam 50 is mated to the bezel 14.

Optionally, as the spring beam 50 is deflected by the bezel 14, a distal end 72 of the base 50 may be moved toward the wall 28 and may engage the wall 28. The base 58 may be pressed against the wall 28 at an arm support point 74. The arm support point 74 may be defined at the distal end 72. When the base 58 is supported against the wall 28 at the arm support point 74, the base 58 stops flexing or deforming and creates a rigid support point for the arm 60. Optionally, the base 58 may engage the wall 28 at multiple arm support points 74, thus defining multiple points of contact with the cage member 18. The arm 60 may extend from the base 58 at one of the arm support points 74.

In an exemplary embodiment, as the base 58 is deflected toward the wall 28, a portion of the base 58, such as a middle portion of the base 58, may be partially bowed outward toward the bezel 14 at the opening 12. As the base 58 is bowed outward, the base 58 may be pressed against the interior edge 76 of the bezel 14 defining the opening 12. The base 58 includes a bezel mating interface 78 at the point where the base 58 engages the interior edge 76 of the bezel 14. The base 58 is directly electrically connected to the bezel 14 at the bezel mating interface 78.

In an exemplary embodiment, the spring beam 50 is electrically connected to the cage member 18 at both the exit point 54 and at the arm support point 74. The base 58 supports the arm 60 from the arm support point 74, which is remote from the front end 24 of the cage member 18. In an exemplary embodiment, the base 58 supports the arm 60 at the arm support point 74 rearward of the interior surface 25 of the bezel 14, which allows the arm 60 to press against the interior surface 25 of the bezel 14 with forward bias. In an exemplary embodiment, utilizing the arm support point 74 decreases the moment arm or effective length of the spring beam 50, as the arm support point 74 is closer to the bezel mating interface 62 than the exit point 54, which may increase the spring force or holding force of the spring beam 50 against the bezel 14.

In an exemplary embodiment, the arm 60 includes a curved finger 80 configured to engage the interior surface 25 of the bezel 14. The bezel mating interface 62 is provided along the curved finger 80. The arm 60 is curled forward to define the curved finger 80. The curled or curved finger 80 provides a curved interface for mating with the bezel 14. The curved finger 80 extends forward from an upstanding portion 82 of the arm 60 and the upstanding portion 82 extends from the base 58. Optionally, when the curved finger 80 engages the bezel 14, the upstanding portion 82 may be elastically deformed such as by bowing outward away from the bezel 14. As the arm 60 is bowed or flexed, an internal spring force is created in the arm 60 to bias the arm 60 against the bezel 14.

Figure 4:
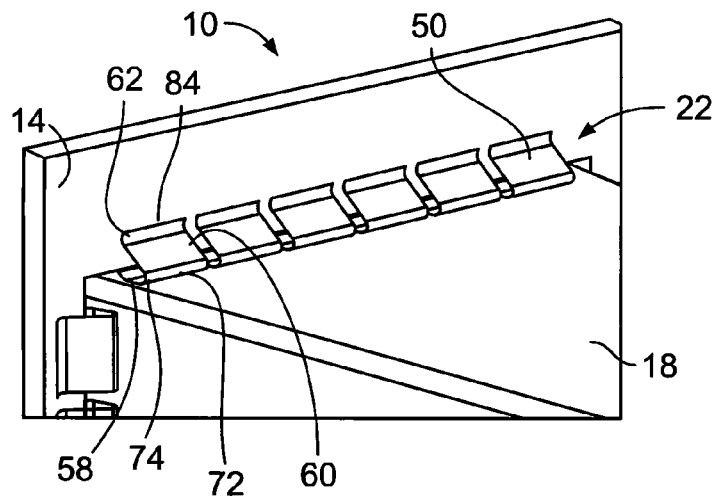
FIG. 4 is a rear perspective view of a portion of the connector assembly showing a spring beam formed in accordance with an exemplary embodiment.
Figure 5:
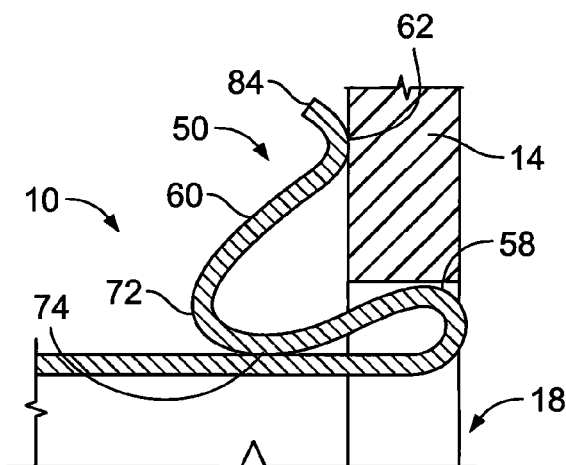
FIG. 5 is a cross-sectional view of the connector assembly shown in FIG. 4.

FIG. 4 is a rear perspective view of a portion of the connector assembly 10 showing the spring beams 50 having a different shape than the embodiment shown in FIG. 1. FIG. 5 is a cross-sectional view of the connector assembly 10. The embodiment of the connector assembly 10 shown in FIGS. 4-5 is similar to the embodiment shown in FIG. 1 and thus like components are identified with like reference numerals.

The spring beams 50, at the distal ends 72 of the bases 58, have flat arm support points 74. As such, the arms 60 may be held more rigidly as compared to the embodiment shown in FIGS. 2-3.

The arms 60 of the spring beams 50 are shaped differently and do not include the inwardly curved finger 80 (FIGS. 2-3), but rather, distal ends 84 of the arms 60 are flared outwardly away from the bezel 14. The flared end reduces stubbing when the EMI skirt 22 is loaded onto the cage member 18. The bezel mating interfaces 62 are provided at or near the distal ends 84. The arms 60 are shorter than the embodiment shown in FIGS. 2-3, reducing the amount of material needed to form the spring beams 50. The arms 60 are configured to be elastically deformed when mated to the bezel 14 to impart a spring back force against the bezel 14 to ensure that the arms 60 remain in contact with the bezel 14.

Figure 6:
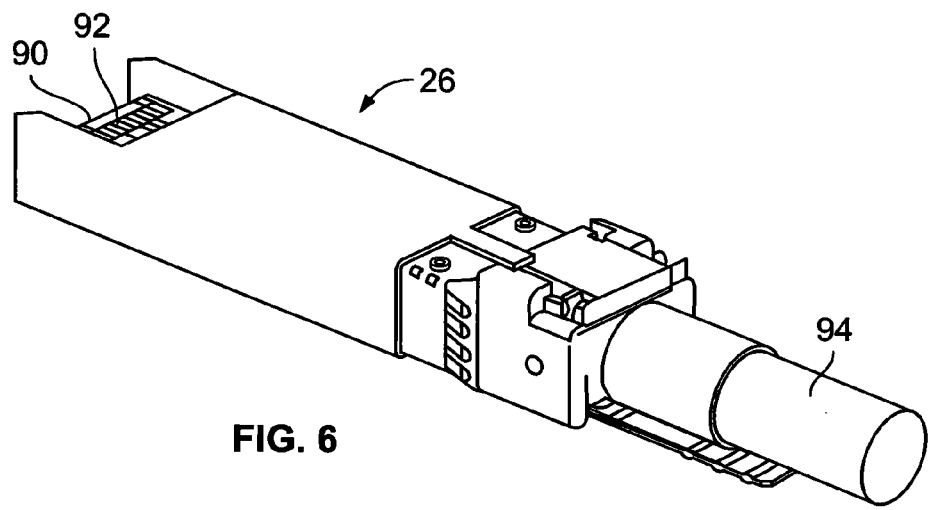
FIG. 6 is a perspective view of an exemplary embodiment of a pluggable module configured to be received in the cage member.

FIG. 6 is a perspective view of an exemplary embodiment of the pluggable module 26. Although illustrated as a small form-factor pluggable (SFP) module, the pluggable module 26 may be any suitable type of electrical connector, such as a transceiver. The pluggable module 26 includes a circuit board 90 that is configured to be electrically connected to the communication connector 20 (shown in FIG. 1) such that electrical contacts 92 on the circuit board 90 are electrically connected to corresponding electrical contacts of the communication connector 20.

In the exemplary embodiment, the pluggable module 26 is electrically connected to a cable 94. Alternatively, the pluggable module 26 includes an interface (not shown) for electrical connection to another component, such as, but not limited to, a modular jack (not shown), a fiber optic connector and/or the like.

The embodiments described and illustrated herein provide a connector assembly for pluggable modules that reduces leakage of EMI emissions through the bezel. Various embodiments described and illustrated herein provide an EMI skirt having spring beams configured to engage the interior surface of the bezel. Various embodiments described and illustrated herein provide an EMI skirt that is integral with the cage member.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. A connector assembly comprising:
a cage member having a plurality of walls defining a port configured to receive a pluggable module therein through a front end of the cage member, the walls extending rearward from the front end to a rear end of the cage member, the walls being manufactured from a metal material and providing electrical shielding for the port, the cage member being configured to be mounted generally behind an interior surface of a bezel and being aligned with an opening in the bezel to receive the pluggable module; and
an EMI skirt at the front end of the cage member, the EMI skirt comprising plural spring beams extending from the walls at exit points, the spring beams and the cage member being integral and having a unibody design, each spring beam having a front bend at the exit point from the corresponding wall at the front end of the cage member, each spring beam having a base extending rearward from the front bend along the exterior of the cage member and spaced apart from the corresponding wall of the cage member, the base being configured to pass through the opening in the bezel to a position rearward of the interior surface of the bezel, each spring beam having an arm extending from the base outward in a direction generally away from the cage member, the arm being configured to reside behind the bezel, the arms having bezel mating interfaces configured to engage and electrically connect to the interior surface of the bezel.

2. The connector assembly of claim 1, wherein the spring beams are stamped and formed from the cage member.

3. The connector assembly of claim 1, wherein each wall includes multiple spring beams integral therewith and extending therefrom.

4. The connector assembly of claim 1, wherein the spring beams are configured to be elastically deformed when the bezel mating interfaces of the arms engage the interior surface of the bezel to create an internal spring force biasing the arm against the bezel.

5. The connector assembly of claim 1, wherein the arms include curved fingers configured to engage the interior surface of the bezel remote of the opening.

6. The connector assembly of claim 1, wherein the arms are curled forward to engage the interior surface of the bezel.

7. The connector assembly of claim 1, wherein the arms extend from the bases at approximate right angles.

8. The connector assembly of claim 1, wherein the bases have bezel mating interfaces configured to engage and electrically connect to interior edges of the bezel defining the opening in the bezel.

9. The connector assembly of claim 1, wherein each spring beam has multiple contact points with the bezel to define a plurality of bezel mating interfaces.

10. The connector assembly of claim 1, wherein the spring beams are flexible, the bases being configured to engage the corresponding walls of the cage member remote from the front end to define corresponding arm support points.

11. The connector assembly of claim 10, wherein each spring beam is electrically connected to the cage member at both the exit point and the arm support point.

12. The connector assembly of claim 10, wherein the arm supports the arm from the arm support point remote from the front end and rearward of the interior surface of the bezel.

13. The connector assembly of claim 1, wherein the spring beams are connected to the walls at the front end, the front bends initially extending forward of the front end.

14. An EMI skirt for a cage member of a connector assembly mounted behind a bezel and aligned with an opening in the bezel for receiving a pluggable module therein, the EMI skirt comprising:

spring beams being configured to be received in the opening of the bezel, the spring beams extending from connection points of corresponding walls of the cage member at a front end of the cage member;

each spring beam having a front bend at the connection point, the front bend bending the spring beam exterior of the cage member;

each spring beam having a base extending rearward from the front bend along the exterior of the cage member and spaced apart from the corresponding wall of the cage member;

each spring beam having an arm extending from the base outward in a direction generally away from the cage member;

wherein the bases of the spring beams each having bezel mating interfaces configured to engage and electrically connect to the bezel and the arms of the spring beams each having bezel mating interfaces configured to engage and electrically connect to the bezel such that each spring beam is configured to engage the bezel at multiple contact points defined by the bezel mating interfaces, the bezel mating interfaces of the bases being remote form the bezel mating interfaces of the arms.

* * * * *